(12) United States Patent
Nolan et al.

(10) Patent No.: US 10,311,907 B2
(45) Date of Patent: Jun. 4, 2019

(54) APPARATUS COMPRISING MAGNETICALLY SOFT UNDERLAYER

(71) Applicant: SEAGATE TECHNOLOGY LLC, Cupertino, CA (US)

(72) Inventors: Thomas P. Nolan, Fremont, CA (US); Li Tang, Fremont, CA (US); Yong-Chang Feng, Fremont, CA (US); Zhong (Stella) Wu, Fremont, CA (US); Samuel D. Harkness, Berkeley, CA (US); Hans J. Richter, Palo Alto, CA (US); Youfeng Zheng, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 1217 days.

(21) Appl. No.: 14/229,750

(22) Filed: Mar. 28, 2014

(65) Prior Publication Data

US 2014/0313615 A1    Oct. 23, 2014

Related U.S. Application Data

(63) Continuation of application No. 11/448,770, filed on Jun. 8, 2006, now abandoned.

(51) Int. Cl.
*G11B 5/667* (2006.01)
*G11B 5/127* (2006.01)

(52) U.S. Cl.
CPC .......... *G11B 5/667* (2013.01); *G11B 5/1278* (2013.01)

(58) Field of Classification Search
CPC .............................. G11B 5/1278; G11B 5/667
See application file for complete search history.

(56) References Cited

U.S. PATENT DOCUMENTS

| | | | | |
|---|---|---|---|---|
| 5,851,643 A * | 12/1998 | Honda | ...................... | G11B 5/66 360/97.11 |
| 2003/0064253 A1 * | 4/2003 | Uwazumi | ............... | G11B 5/732 428/833.3 |
| 2004/0247945 A1 * | 12/2004 | Chen | ...................... | G11B 5/667 428/828 |
| 2007/0037018 A1 * | 2/2007 | Futamoto | ................. | G11B 5/64 428/828.1 |

FOREIGN PATENT DOCUMENTS

JP    2001155322 A  *  6/2001

* cited by examiner

*Primary Examiner* — Holly C Rickman
*Assistant Examiner* — Lisa Chau

(57) ABSTRACT

Provided herein is an apparatus, including a magnetically soft underlayer (SUL); an interlayer stack overlying the SUL, wherein the interlayer stack comprises a seed layer of an fcc material; and a perpendicular magnetic recording layer overlying the interlayer stack, wherein a thickness of the SUL in combination with a distance of the SUL from the perpendicular recording layer is sufficient to orient a total magnetic field corresponding to a magnetic transducer head at an angle of about 45°.

20 Claims, 4 Drawing Sheets

APPARATUS COMPRISING MAGNETICALLY SOFT UNDERLAYER

CROSS REFERENCE

This application is a continuation of U.S. patent application Ser. No. 11/448,770, filed Jun. 8, 2006.

FIELD OF THE INVENTION

The present invention relates to improved perpendicular magnetic recording media with very thin magnetically soft underlayers (SUL's) and magnetic recording systems utilizing the improved media with ring-type magnetic transducer heads. The invention has particular utility in the manufacture and use of very high areal recording density media, such as hard disks, comprising perpendicular magnetic recording layers.

BACKGROUND OF THE INVENTION

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Perpendicular recording media have been found to be superior to longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

At present, efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 1 kOe, such as of a NiFe alloy (Permalloy), between a non-magnetic substrate, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the magnetically hard perpendicular recording layer.

A typical conventional perpendicular recording system 10 with a perpendicularly oriented magnetic medium 1 and a magnetic transducer head 9 is schematically illustrated in cross-section in FIG. 1, wherein reference numeral 2 indicates a non-magnetic substrate, reference numeral 3 indicates an optional adhesion layer, reference numeral 4 indicates a relatively thick magnetically soft underlayer (SUL), reference numeral 5 indicates an interlayer stack comprising at least one non-magnetic interlayer, sometimes referred to as an "intermediate" layer, and reference numeral 6 indicates at least one relatively thin magnetically hard perpendicular recording layer with its magnetic easy axis perpendicular to the film plane. Interlayer stack 5 commonly includes at least one interlayer $5_B$ of a hcp material adjacent the magnetically hard perpendicular recording layer 6 and an optional seed layer $5_A$ adjacent the magnetically soft underlayer (SUL) 4, typically comprising at least one of an amorphous material and an fcc material.

Still referring to FIG. 1, reference numerals $9_M$ and $9_A$, respectively, indicate the main (writing) and auxiliary poles of the magnetic transducer head 9. The relatively thin interlayer 5, comprised of one or more layers of non-magnetic materials, serves to (1) prevent magnetic interaction between the magnetically soft underlayer 4 and the at least one magnetically hard recording layer 6; and (2) promote desired microstructural and magnetic properties of the at least one magnetically hard recording layer 6.

As shown by the arrows in the figure indicating the path of the magnetic flux $\phi$, flux $\phi$ emanates from the main writing pole $9_M$ of magnetic transducer head 9, enters and passes through the at least one vertically oriented, magnetically hard recording layer 6 in the region below main pole $9_M$, enters and travels within soft magnetic underlayer (SUL) 4 for a distance, and then exits therefrom and passes through the at least one perpendicular hard magnetic recording layer 6 in the region below auxiliary pole $9_A$ of transducer head 9. The direction of movement of perpendicular magnetic medium 21 past transducer head 9 is indicated in the figure by the arrow in the figure.

Completing the layer stack of medium 1 is a protective overcoat layer 7, such as of a diamond-like carbon (DLC), formed over magnetically hard layer 6, and a lubricant topcoat layer 8, such as of a perfluoropolyether (PFPE) material, formed over the protective overcoat layer.

Substrate 2 is typically disk-shaped and comprised of a non-magnetic metal or alloy, e.g., Al or an Al-based alloy, such as Al—Mg having a Ni—P plating layer on the deposition surface thereof, or alternatively, substrate 2 is comprised of a suitable glass, ceramic, glass-ceramic, polymeric material, or a composite or laminate of these materials. Optional adhesion layer 3, if present on substrate surface 2, typically comprises a less than about 200 Å thick layer of a metal or a metal alloy material such as Ti, a Ti-based alloy, Ta, a Ta-based alloy, Cr, or a Cr-based alloy. The relatively thick soft magnetic underlayer 4 is typically comprised of an about 50 to about 300 nm thick layer of a soft magnetic material such as Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. Relatively thin interlayer stack 5 typically comprises an about 50 to about 300 Å thick layer or layers of non-magnetic material(s). Interlayer stack 5 includes at least one interlayer $5_A$ of a hcp material, such as Ru, TiCr, Ru/CoCr$_{37}$Pt$_6$, RuCr/CoCrPt, etc., adjacent the magnetically hard perpendicular recording layer 6. When present, seed layer $5_B$ adjacent the magnetically soft underlayer (SUL) 4 may typically include a less than about 100 Å thick layer of an fcc material, such as an alloy of Cu, Ag, Pt, or Au, or an amorphous or fine-grained material, such as Ta, TaW, CrTa, Ti, TiN, TiW, or TiCr. The at least one magnetically hard perpendicular recording layer 6 is typically comprised of an about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd.

Of the conventional media types described above, longitudinal media are more developed than perpendicular media and have been utilized for several decades in the computer industry. During this interval, components and sub-systems, such as transducer heads, channels, and media, have been repeatedly optimized in order to operate efficiently within computer environments. However, it is a common current belief that longitudinal recording is reaching the end of its lifetime as an industry standard in computer applications owing to physical limits which effectively prevent further increases in areal recording density.

Perpendicular media, on the other hand, are expected to replace longitudinal media in computer-related recording applications and continue the movement toward ever-increasing areal recording densities far beyond the capability of longitudinal media. However, perpendicular media and recording technology is less well developed than all facets of longitudinal media and recording technology. Specifically, each individual component of perpendicular magnetic recording technology, including transducer heads, media, and recording channels, is less completely developed and optimized than the corresponding component of longitudinal recording technology. As a consequence, the gains observed with perpendicular media and systems vis-à-vis the prior art, i.e., longitudinal media and systems, are difficult to assess.

In view of the foregoing, there exists a clear need for improved perpendicular media and system technology therefor which are designed to function in optimal fashion and provide a full range of benefits and performance enhancement vis-à-vis conventional longitudinal media and systems, consistent with expectation afforded by adoption of perpendicular media as an industry standard in computer-related applications.

SUMMARY OF THE INVENTION

An advantage of the present invention is improved perpendicular magnetic recording media.

Another advantage of the present invention is improved perpendicular magnetic recording media capable of operation with ring-type magnetic transducer heads.

Still another advantage of the present invention is improved perpendicular magnetic recording systems comprising ring-type magnetic transducer heads.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved perpendicular magnetic recording medium, comprising:

(a) a non-magnetic substrate having a surface; and (b) a stacked plurality of thin film layers forming a layer stack overlying the substrate surface and including a magnetically soft underlayer (SUL) beneath at least one perpendicular magnetic recording layer, the SUL having a saturation magnetization ($M_s$)-thickness (t) product ($M_s t$) less than about 4 memu/cm$^2$.

According to embodiments of the present invention, the SUL comprises a material having a saturation magnetization (Ms) of about 500 to about 2,000 emu/cc and a thickness from about 1 to about 40 nm; and the SUL and the at least one perpendicular magnetic recording layer are spaced apart at a spacing determined by an interlayer stack between the SUL and the at least one perpendicular magnetic recording layer.

In accordance with certain preferred embodiments of the present invention, the SUL and the at least one perpendicular magnetic recording layer are spaced apart from about 5 to about 200 nm; whereas, according to other preferred embodiments of the invention, the SUL and the at least one perpendicular magnetic recording layer are spaced apart from about 30 to about 100 nm.

Preferably, the interlayer stack includes a spacer layer and an interlayer; the spacer layer comprises an amorphous material; the interlayer comprises an hcp material with a preferred c-axis perpendicular growth orientation; and the interlayer stack further includes a seed layer.

According to further preferred embodiments of the present invention, the SUL has a saturation magnetization ($M_s$)-thickness (t) product ($M_s t$) less than about 1 memu/cm$^2$; the SUL comprises a material having a magnetic permeability greater than about 10 and a thickness less than about 10 nm; and the SUL comprises at least one soft magnetic material selected from the group consisting of: Ni, Co, Fe, NiFe (Permalloy), FeN, FeSiAl, FeSiAlN, CoZr, CoZrCr, CoZrNb, CoFeZrNb, CoFe, FeCoB, and FeCoC.

Preferred embodiments of the present invention include those wherein the at least one perpendicular magnetic recording layer comprises an hcp Co-based alloy with a preferred c-axis perpendicular growth orientation; the at least one perpendicular magnetic recording layer comprises at least partially isolated magnetic particles or grains with c-axis growth orientation; and/or the at least one perpendicular magnetic recording layer comprises a granular layer with uniform grain size, composition, and crystallographic orientation.

In accordance with embodiments of the present invention, the layer stack comprises a protective overcoat layer above the at least one perpendicular magnetic recording layer and a lubricant topcoat layer over the protective overcoat layer, the protective overcoat layer comprising a carbon-based material and the lubricant topcoat layer comprising a fluoropolymer material; and the non-magnetic substrate comprises a material selected from the group consisting of: Al, Al—Mg alloys, other Al-based alloys, NiP-plated Al or Al-based alloys, glass, ceramics, glass-ceramics, polymeric materials, and composites or laminates of these materials.

Another aspect of the present invention is a perpendicular magnetic recording system, comprising:

(a) a perpendicular magnetic recording medium including:
  (i) a non-magnetic substrate having a surface; and
  (ii) a stacked plurality of thin film layers forming a layer stack overlying said substrate surface and including a magnetically soft underlayer (SUL) beneath and spaced from at least one perpendicular magnetic recording layer; and (b) a ring-type magnetic transducer head positioned in spaced adjacency to an upper surface of the layer stack to form a head gap, the transducer head comprising leading and trailing poles.

According to embodiments of the present invention, the SUL has a saturation magnetization ($M_s$)-thickness (t) product ($M_s t$) less than about 4 memu/cm$^2$ and the orientation ratio of the medium of the system is greater than about 10.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the same reference numerals are employed throughout for designating the same or similar features, and wherein the various features are not necessarily drawn to scale but rather are drawn as to best illustrate the pertinent features, wherein.

DETAILED DESCRIPTION OF THE INVENTION

Figure 1:
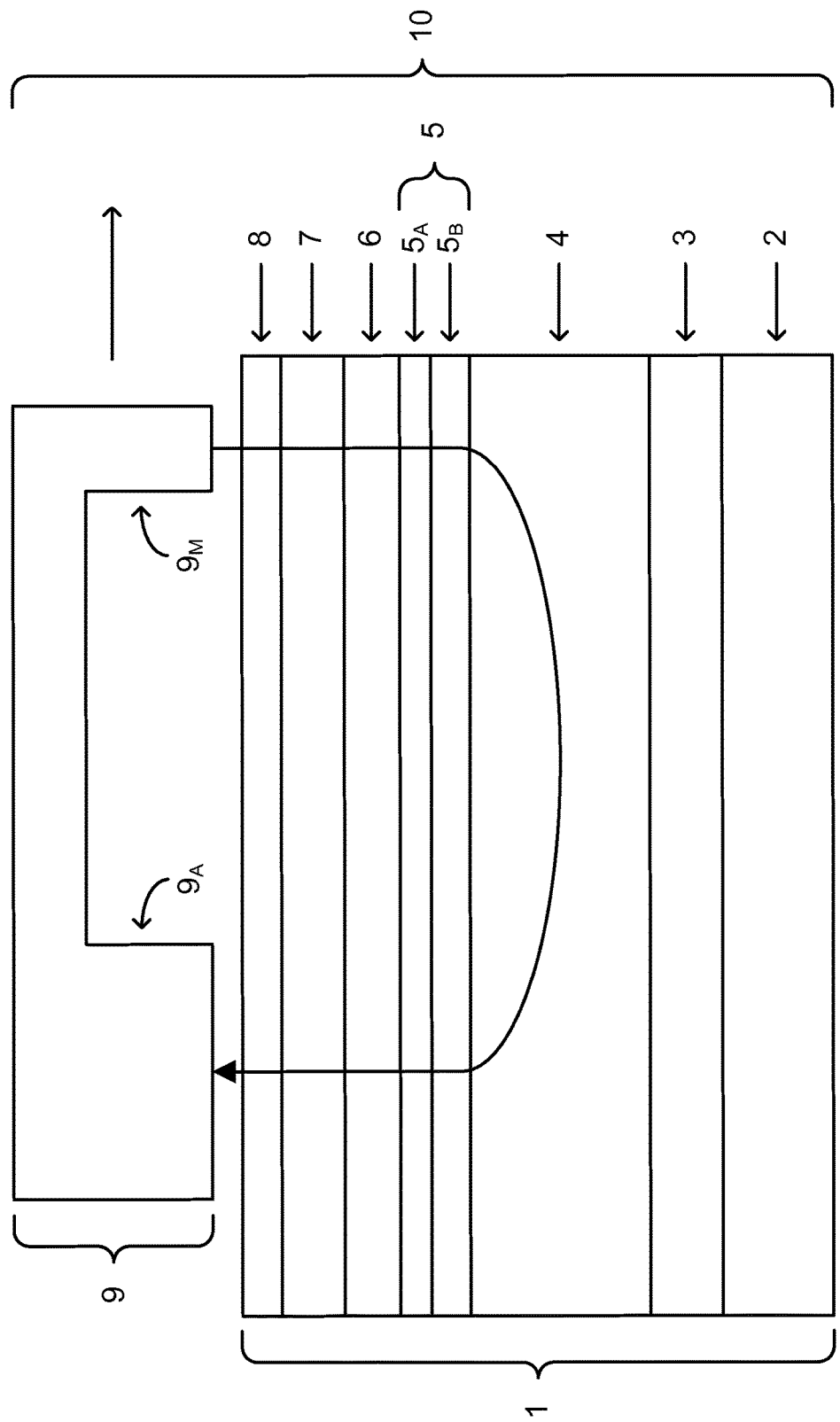
FIG. 1 schematically illustrates, in simplified cross-sectional view, a portion of a magnetic recording, storage, and retrieval system 10 according to the conventional art, comprised of a conventionally structured perpendicular magnetic recording medium 1 and a single-pole magnetic transducer head 9.

The present invention is based upon recognition that obtainment of optimized perpendicular magnetic recording media and systems therefor is facilitated by design and utilization of perpendicular media which are specifically designed and adapted for functioning in combination with well-developed and optimized system components of longitudinal magnetic recording systems. In particular, the present invention is based upon utilization of improved perpendicular magnetic recording media designed for use with the "ring"-type transducer heads associated with longitudinal magnetic recording media, rather than with the heretofore utilized "single pole" type transducer heads such as have been described supra.

According to the present invention, therefore, perpendicular media of improved, optimal design operate in concert with ring-type transducer heads according to a recording paradigm wherein the magnetic recording process occurs within or proximate the head gap, i.e., between the trailing edge of the trailing pole and the leading edge of the leading pole. The invention provides a method for altering the head field from a ring type transducer head so as to optimize it for perpendicular recording. In addition, the present invention enables the perpendicular media to maintain a desirable microstructure and facilitates obtainment of significant improvement in recording performance and reliability, compared to conventional longitudinal and perpendicular magnetic recording media.

As indicated supra, conventional thin film perpendicular magnetic recording media typically comprise a relatively thick, magnetically soft underlayer (SUL) of high saturation magnetization ($M_s$) beneath the perpendicular magnetic recording layer(s) that serves to maximize the perpendicular component of the head field for strong writing behind the trailing edge of the relatively smaller, trailing edge of the main pole of the single-pole transducer head, and then shunt or spread out and transmit the head field horizontally toward the relatively larger, auxiliary (or return) pole that minimally affects the recording process. Such single-pole transducer heads produce a strong vertical field at the recording layer in the "head gap" between the main pole and the SUL of the medium. Recording generally occurs near the trailing edge of the main pole.

On the other hand, ring-type transducer heads utilized with longitudinal media have a high, horizontally oriented magnetic field in the horizontal gap between each of the two magnetic poles, and writing of the media is performed in front of the front edge of the trailing pole, employing the fringing field beneath the poles that includes large horizontal and vertical components. When conventional perpendicular media of the prior art are utilized with a ring-type transducer head, the SUL causes the magnetic flux at both the leading and trailing poles to become vertical, and fairly strong, at the trailing edge of the trailing pole and at the leading edge of the leading pole. However, the shape of the trailing pole is not optimized for the perpendicular field, and the leading (front) pole is not sufficiently large as to avoid erasure. As a consequence, the ability to write conventional perpendicular media with ring-type transducer heads is very poor, and the recording performance is correspondingly poor.

In this regard, perpendicular media can be fabricated without the SUL and utilized with a ring-type transducer head. In this instance, the ring-type head attempts to write the media at the front edge of the trailing pole, but a significant portion of the field lies in the horizontal direction, and correspondingly, the write capability and recording performance are much lower than desired.

The present invention is based upon recognition that, in order to optimize writing of perpendicular media by means of a ring-type transducer head such as is utilized with longitudinal media, it is better to apply a magnetic field with a greater perpendicular component, preferably with a very high total field at an angle approaching 45° away from the horizontal. It is also desirable to increase the vertical component in order to increase the size of the recording "write bubble", and thereby reduce interaction between the high field regions at the leading and trailing poles of the ring type magnetic transducer head. According to the invention, the vertical component of the fringing magnetic field at the leading edge of the trailing pole is increased, without resorting to a trailing edge vertical field, by fabricating the perpendicular media with a much thinner SUL than utilized in conventional perpendicular media, or by positioning the SUL at a much greater distance from the magnetic recording layer than in conventional perpendicular media.

More specifically, conventional perpendicular magnetic recording media of the prior art generally comprise a SUL with a magnetization-thickness product ($M_s t$) in the range from about 5 to about 60 memu/cm$^2$, corresponding to $M_s$ generally in the range from about 1,000 to about 2,000 emu/cc$^2$ and thickness ranging from about 50 to about 300 nm, and the spacing between the recording layer and the SUL is generally from about 5 to about 30 nm.

It has been determined, however, that perpendicular media with a thin SUL having a $M_s t$ product less than about 4 memu/cm$^2$ utilized in combination with ring-type transducer heads exhibit significantly improved system performance. Improved system performance, relative to when no SUL is present in the perpendicular media, is obtained with as little as 1 nm thickness of a 1,000 emu/cc SUL material positioned at as great a spacing as about 100 nm from the perpendicular recording layer. As a consequence, it is evident that improved perpendicular magnetic recording media can be designed and fabricated according to the principles of the present invention so as to optimize the write field tilt angle of a ring-type magnetic transducer head (such as typically utilized with longitudinal media systems) and thereby obtain significantly improved recording performance, including higher areal recording densities than are obtainable from conventional longitudinal or perpendicular magnetic recording media and systems of the prior art.

Figure 2:
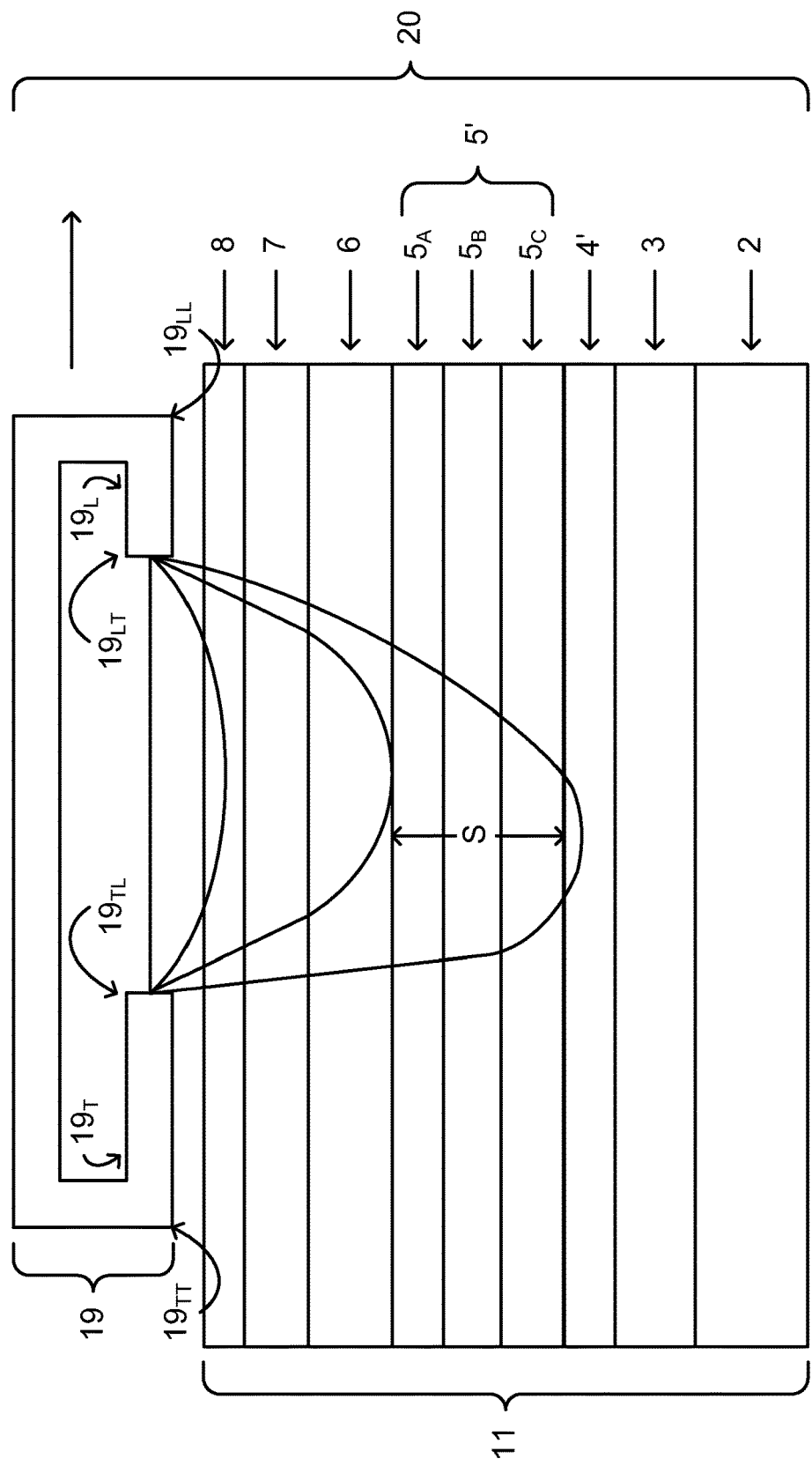
FIG. 2 schematically illustrates, in simplified cross-sectional view, a portion of a magnetic recording, storage, and retrieval system 20 according to an illustrative, but non-limitative, embodiment of the present invention, comprised of a perpendicular magnetic recording medium 11 structured for use with ring-type magnetic transducer head 19.

Referring to FIG. 2, schematically illustrated therein, in simplified cross-sectional view, is a portion of a magnetic recording, storage, and retrieval system 20 according to an illustrative, but non-limitative, embodiment of the present invention, comprised of a perpendicular magnetic recording medium 11 structured for use with ring-type magnetic transducer head 19. More specifically, medium 11 according to the present invention generally resembles the conventional perpendicular medium 1 of FIG. 1, and comprises a series of thin film layers arranged in an overlying (i.e., stacked) sequence on a non-magnetic substrate 2 comprised of a non-magnetic material selected from the group consisting of: Al, Al—Mg alloys, other Al-based alloys, NiP-plated Al or Al-based alloys, glass, ceramics, glass-ceramics, polymeric materials, and composites or laminates of these materials.

The thickness of substrate 2 is not critical; however, in the case of magnetic recording media for use in hard disk applications, substrate 2 must be of a thickness sufficient to provide the necessary rigidity. Substrate 10 typically comprises Al or an Al-based alloy, e.g., an Al—Mg alloy, or glass or glass-ceramics, and, in the case of Al-based substrates, includes a plating layer, typically of NiP, on the surface of substrate 2 (not shown in the figure for illustrative simplicity). An optional adhesion layer 3, typically a less than about 100 Å thick layer of an amorphous metallic material or a fine-grained material, such as a metal or a metal alloy material, e.g., Ti, a Ti-based alloy, Ta, a Ta-based alloy, Cr, or a Cr-based alloy, may be formed over the surface of substrate surface 2 or the NiP plating layer thereon.

Overlying substrate 2 or optional adhesion layer 3 is a thin magnetically soft underlayer (SUL) 4' formed according to the principles of the present invention, wherein the SUL 4' is sufficiently magnetically strong as to cause the head field near the leading edge of the trailing pole of a magnetic transducer head to be more vertical near the head gap, but not magnetically strong enough as to induce a large vertical field at the trailing edge of the trailing pole. According to embodiments of the present invention, a saturation magnetization ($M_s$)-thickness (t) product ($M_s t$) of SUL 4' is less than about 4 memu/cm$^2$.

In accordance with embodiments of the present invention, the SUL 4' comprises a layer of a material from about 1 to about 40 nm thick and having a saturation magnetization ($M_s$) of about 500 to about 2,000 emu/cc, selected from the group consisting of: Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC; and is vertically spaced apart by about 5 to about 200 nm, illustratively from about 30 to about 100 nm, from the lower edge of overlying perpendicular magnetic recording layer 6.

Preferably, SUL 4' has a saturation magnetization ($M_s$)-thickness (t) product ($M_s t$) less than about 1 memu/cm$^2$ and comprises a material having a magnetic permeability greater than about 10 and a thickness less than about 10 nm.

As before, an optional adhesion layer 3 may be included in the layer stack of medium 11 between the surface of substrate surface 2 and the SUL 4', the adhesion layer 3 being less than about 200 Å thick and comprised of a metal or a metal alloy material such as Ti, a Ti-based alloy, Ta, a Ta-based alloy, Cr, or a Cr-based alloy.

Still referring to FIG. 2, the layer stack of medium 11 further comprises a non-magnetic interlayer stack 5' between SUL 4' and at least one overlying perpendicular magnetic recording layer 6, which interlayer stack 5' can be of substantially greater thickness than that of conventional perpendicular media, e.g., SUL 4 of medium 1 shown in FIG. 1. According to a key feature of the present invention, the relatively thick interlayer stack 5' generally provides optimal performance at thicknesses from about 30 nm to about 100 nm, and in many instances, may provide a performance benefit at thicknesses ranging from about 5 to about 200 nm. Interlayer stack 5', comprised of sequentially stacked amorphous spacer layer $5_C$, optional seed layer $5_B$, and interlayer $5_A$, is utilized, inter alia, for determining/controlling the spacing s between the SUL 4' and the lower edge of the at least one perpendicular magnetic recording layer 6 to the above-described ranges, i.e., from about 5 to about 200 nm, including from about 30 to about 100 nm, and for facilitating a preferred perpendicular growth orientation of the overlying at least one perpendicular magnetic recording layer 6. Suitable non-magnetic materials for use as interlayer $5_A$ adjacent the magnetically hard perpendicular recording layer 6 include hcp materials, such as Ru, TiCr, Ru/CoCr$_{37}$Pt$_6$, RuCr/CoCrPt, etc.; suitable materials for use as optional seed layer $5_B$ typically include an fcc material, such as an alloy of Cu, Ag, Pt, or Au, or an amorphous or fine-grained material, such as Ta, TaW, CrTa, Ti, TiN, TiW, or TiCr; and amorphous spacer layer $5_C$ adjacent SUL 4', utilized for increasing the spacing s between the lower edge of the perpendicular magnetic recording layer 6 and the SUL 4', is from about 20 to about 100 nm thick, and typically comprised of an amorphous material such as CrTa, TaW, TiCr, or TiW. In this regard, the use of interlayer stacks 5' with thicknesses as great as about 200 nm, as described above, enables obtainment of performance advantages (e.g., use of ring-type magnetic transducer heads) with perpendicular media designs including thicker, higher $M_s t$ product SUL's 4'.

According to embodiments of the present invention, the at least one magnetically hard perpendicular magnetic recording layer(s) 6 is (are) typically comprised of (an) about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd. Preferably, the at least one perpendicular magnetic recording layer 6 comprises a fine-grained hcp Co-based alloy with a preferred c-axis perpendicular growth orientation; and the interlayer stack 5' comprises a fine-grained hcp material with a preferred c-axis perpendicular growth orientation. In addition, the at least one perpendicular magnetic recording layer 6 is preferably comprised of at least partially isolated, uniformly sized and composed, magnetic particles or grains with c-axis growth orientation.

Finally, the layer stack of medium 11 includes a protective overcoat layer 7 above the at least one perpendicular magnetic recording layer 6 and a lubricant topcoat layer 8 over the protective overcoat layer 7. Preferably, the protective overcoat layer 7 comprises a carbon-based material, e.g., diamond-like carbon ("DLC"), and the lubricant topcoat layer 8 comprises a fluoropolymer material, e.g., a perfluoropolyether compound.

According to the invention, each of the layers 3, 4', 5', 6, 7, as well as the optional seed and adhesion layers (not shown in the figure for illustrative simplicity), may be deposited or otherwise formed by any suitable technique utilized for formation of thin film layers, e.g., any suitable physical vapor deposition ("PVD") technique, including but not limited to, sputtering, vacuum evaporation, ion plating, cathodic arc deposition ("CAD"), etc., or by any combination of various PVD techniques. The lubricant topcoat layer 8 may be provided over the upper surface of the protective overcoat layer 7 in any convenient manner, e.g., as by dipping the thus-formed medium into a liquid bath containing a solution of the lubricant compound.

With continued reference to FIG. 2, as schematically illustrated therein, magnetic data/information recording, storage, and retrieval system 20 includes a ring-type magnetic transducer head 19 positioned in close proximity to the upper surface of medium 11, i.e., the upper surface of lubricant topcoat layer 8. Ring-type magnetic transducer head 19 is of conventional design according to the invention, i.e., similar to ring-type magnetic transducer heads typically utilized with conventional longitudinal magnetic recording media, and includes a leading pole $19_L$ with leading and trailing edges $19_{LL}$ and $19_{LT}$, respectively, and a trailing pole $19_T$ with leading and trailing edges $19_{TL}$ and $19_{TT}$, respectively. According to the invention, in order to optimize writing of perpendicular media by means of ring-type transducer head 19 such as is utilized with longitudinal media, the magnetic field from transducer head 19 is altered by the thin SUL 4' of the present invention to provide a greater perpendicular component, preferably with a very high total field at an angle approaching 45° away from the horizontal. Therefore, according to the invention, the SUL is sufficiently magnetically strong as to cause the head field near the leading edge $19_{TL}$ of the trailing pole $19_T$ of the ring-type magnetic transducer head 19 to be more vertical near the head gap between the lower end of the head poles and the medium surface, but not magnetically strong enough as to induce a large vertical field at the trailing edge $19_{TT}$ of the trailing pole $19_T$. It is important to note in this regard that application of the magnetic field from transducer head 19 with a selected perpendicular component or angle is set and constant, except as altered by the SUL material.

It is also desirable, according to the invention, to increase the vertical component in order to increase the size of the recording "write bubble", and thereby reduce interaction between the high field regions at the leading and trailing poles of the ring type magnetic transducer head. As has been indicated above, according to the invention, the vertical component of the fringing magnetic field at the leading edge of the trailing pole is increased, without causing a trailing edge vertical field sufficient to overwrite the recorded data pattern, by fabricating the perpendicular media with a much thinner SUL than utilized in conventional perpendicular media, or by positioning the SUL at a much greater distance from the magnetic recording layer than in conventional perpendicular media.

Preferred embodiments of the invention include those wherein the perpendicular media used in conjunction with a ring-type magnetic transducer head have an orientation ratio greater than about 10, wherein the latter term is a figure of merit commonly utilized for describing longitudinal media for longitudinal magnetic recording systems with ring-type transducer heads, and is defined as the ratio of coercivity (or remanent magnetization) of the medium measured parallel vs. measured perpendicularly to the magnetization direction of the recorded data bits, i.e., $H_{C\|}/H_C\perp$ or $M_r t_\|/M_r t\perp$. In the instant case for perpendicular media, the parallel direction is vertical (or normal) to the plane of the medium and the perpendicular direction is in the direction of the plane of the medium (i.e., parallel thereto).

Figure 3:
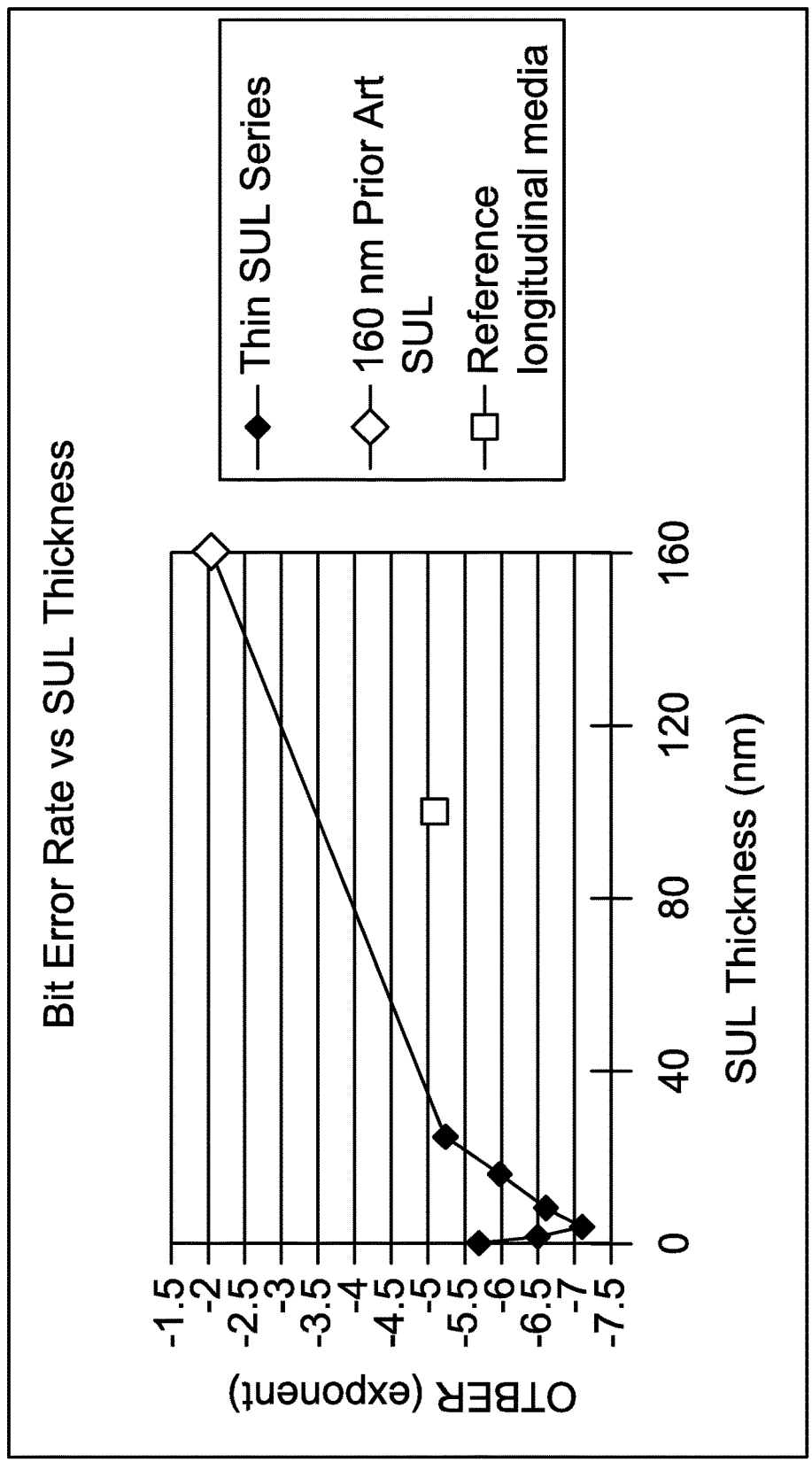
FIG. 3 is a graph for illustrating Bit Error Rate as a function of SUL thickness for improved perpendicular magnetic recording media fabricated according to the principles of the present invention, and utilized in a data/information recording, storage, and retrieval system according to the invention comprising a ring-type transducer head such as conventionally utilized in data/information recording, storage, and retrieval systems comprising longitudinal magnetic recording media.

The efficacy of the present invention will now be described with reference to FIGS. 3 and 4, wherein: FIG. 3 is a graph for illustrating Bit Error Rate as a function of SUL thickness for perpendicular magnetic recording media in a system according to the invention utilizing a ring-type transducer head conventionally utilized in systems comprising longitudinal magnetic recording media; and FIG. 4 is a graph for illustrating Overwrite as a function of SUL thickness for perpendicular magnetic recording media in a system according to the invention utilizing a ring-type transducer head conventionally utilized in systems comprising longitudinal magnetic recording media.

In the following, media recording was performed using a conventional ring-type recording head and channel of a longitudinal type magnetic recording system. Performance of a prior art perpendicular medium with no SUL is represented by the "0 nm" point on the x-axis of each of FIGS. 3 and 4; performance of a prior art perpendicular medium with a conventional thick SUL is represented by the "160 nm" point on the x-axis of each of FIGS. 3 and 4; performance of a prior art longitudinal medium is represented by the "ref" point on the x-axis of each of FIGS. 3 and 4; and each of the perpendicular media shown in FIGS. 3 and 4 had identical microstructure independent of variation in SUL thickness.

Adverting to FIG. 3, an advantage demonstrated therein by thin SUL media according to the present invention is an improved ability to write data bits with significantly reduced error rates. In particular, the 4 nm data point evidences a new design space, and FIG. 3 as a whole demonstrates a dramatic improvement in magnetic recording performance of perpendicular media with ring-type transducer heads such as are employed in longitudinal magnetic recording systems, which dramatic improvement is obtained according to the invention by appropriately adjusting the head field with a very thin soft magnetic underlayer (SUL) or by increasing the spacing s between the perpendicular magnetic recording layer(s) and the SUL.

Figure 4:
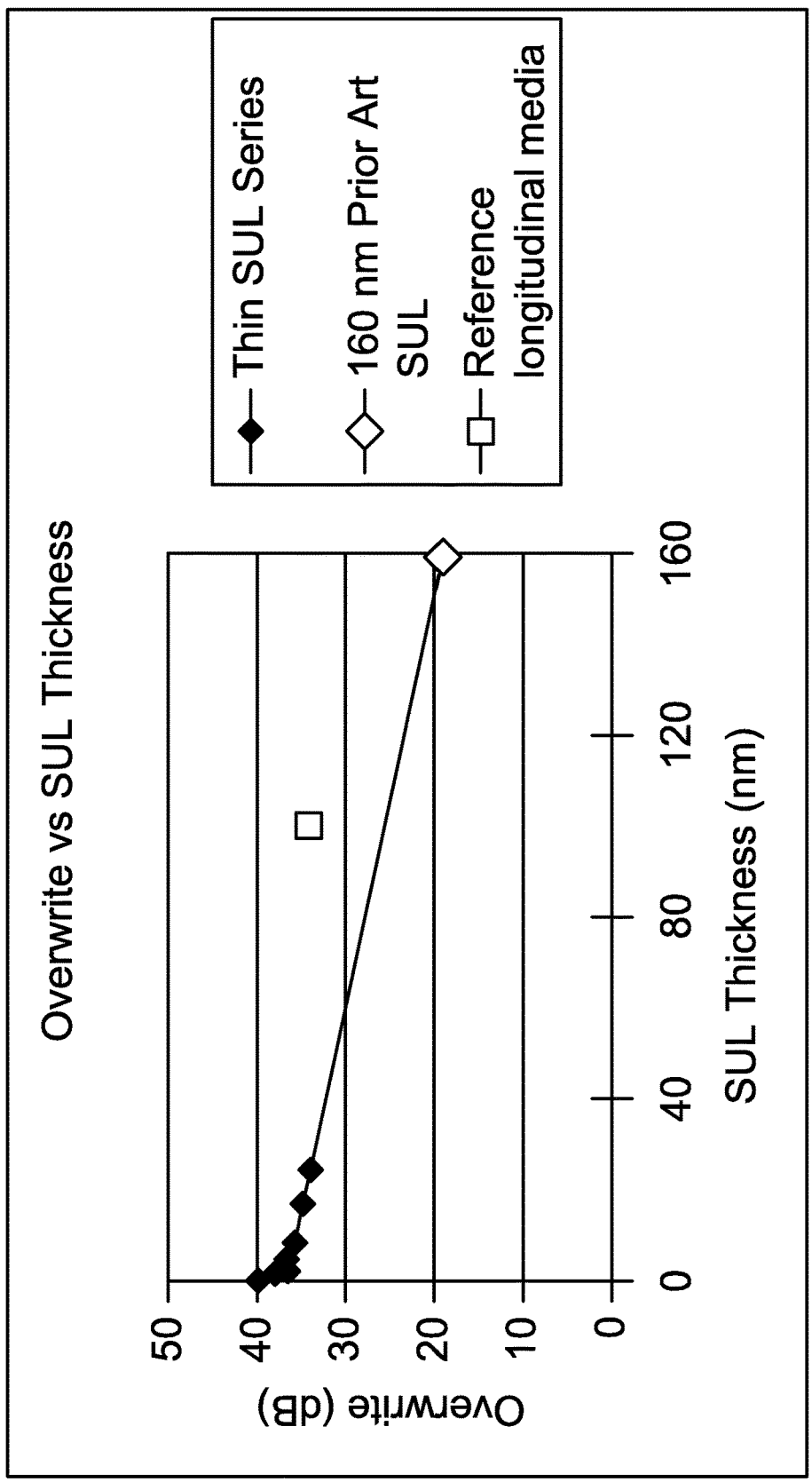
FIG. 4 is a graph for illustrating Overwrite as a function of SUL thickness for improved perpendicular magnetic recording media according to the present invention, utilized in a data/information recording, storage, and retrieval system according to the invention utilizing a ring-type transducer head such as conventionally utilized in data/information recording, storage, and retrieval systems comprising longitudinal magnetic recording media.

Referring now to FIG. 4, an advantage of thin SUL perpendicular magnetic recording media illustrated therein is an improved ability to write data bits to the media. An approximate measure of the ability to write data bits to magnetic media is reverse overwrite for perpendicular media and standard overwrite for longitudinal media. As indicated in the graph of FIG. 4, the media with thinnest SUL's appear to have improved bit writing capability compared to media with thicker SUL's, and comparable write capability to longitudinal media.

Additional advantages of thin SUL perpendicular magnetic recording media according to the present invention include:

1. lower defect counts and higher production yields owing to reduction in the amount of deposited material, specifically less SUL material;

2. improved performance with fewer changes to prior art magnetic recording systems than previously required with perpendicular media; and 3. ability to use higher $M_r t$ products than longitudinal media without incurring a performance penalty, thereby enabling higher read-back amplitudes than with longitudinal media. Such higher read-back amplitudes also enable obtainment of reduced electronic component of recording noise.

Thus, the present invention advantageously provides improved performance, high areal density, magnetic alloy-based perpendicular magnetic media and data/information recording, storage, and retrieval systems, which media include an improved, very thin soft magnetic underlayers (SUL's) which afford improved performance characteristics when utilized in combination with ring-type magnetic transducer heads such as are typically employed with longitudinal media. The media of the present invention enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An apparatus, comprising:
   a magnetically soft underlayer (SUL),
      wherein the SUL has a thickness from about 1 nm to 40 nm;
   an interlayer stack overlying the SUL,
      wherein the interlayer stack comprises a seed layer of an fcc material; and
   a perpendicular magnetic recording layer overlying the interlayer stack,
      wherein the thickness of the SUL in combination with a distance of the SUL from the perpendicular recording layer is sufficient to increase a perpendicular component of a magnetic field corresponding to a magnetic transducer head at an angle approaching 45°.

2. The apparatus of claim 1, wherein the interlayer stack has a thickness from about 5 nm to about 200 nm, and wherein the thickness of the interlayer stack corresponds to the distance of the SUL from the perpendicular recording layer.

3. The apparatus of claim 2, wherein the interlayer stack further comprises
   a spacer layer of CrTa, TaW, TiCr, or TiW underlying the seed layer,
      wherein the spacer layer has a thickness from about 20 nm to about 100 nm; and
   an interlayer of an hcp material overlying the seed layer,
      wherein the interlayer stack prevents magnetic interaction between the SUL and the perpendicular magnetic recording layer.

4. The apparatus of claim 2, wherein the SUL is of one or more materials selected from the group consisting of Ni; Co; Fe; a Co-containing alloy comprising CoZr, CoZrCr, or CoZrNb; an Fe-containing alloy comprising NiFe (Permalloy), FeN, FeSiAl, or FeSiAlN; and a CoFe-containing alloy comprising CoFeZrNb, CoFe, FeCoB, or FeCoC, and wherein the SUL comprises a saturation magnetization-thickness (Mst) product less than about 4 memu/cm².

5. The apparatus of claim 2, wherein the apparatus further comprises a ring-type magnetic transducer head in spaced adjacency to the perpendicular recording layer.

6. An apparatus, comprising:
   a magnetically soft underlayer (SUL);
   an interlayer stack overlying the SUL,
      wherein the interlayer stack has a thickness from 56 nm to about 200 nm, and
      wherein the interlayer stack comprises a seed layer of an fcc material; and
   a perpendicular magnetic recording layer overlying the interlayer stack,
      wherein a thickness of the SUL in combination with a distance of the SUL from the perpendicular recording layer corresponding to the thickness of the interlayer stack is sufficient to increase a perpendicular component of a magnetic field corresponding to a magnetic transducer head at an angle approaching 45°.

7. The apparatus of claim 6, wherein the thickness of the SUL is from about 1 nm to about 40 nm, and wherein the SUL comprises a saturation magnetization-thickness (Mst) product less than about 4 memu/cm².

8. The apparatus of claim 7, wherein the interlayer stack further comprises
   a spacer layer of CrTa, TaW, TiCr, or TiW underlying the seed layer,
      wherein the spacer layer has a thickness from about 20 nm to about 100 nm.

9. The apparatus of claim 7, wherein the interlayer stack further comprises
   an interlayer of an hcp material overlying the seed layer,
      wherein the interlayer stack prevents magnetic interaction between the SUL and the perpendicular magnetic recording layer.

10. The apparatus of claim 7, wherein the apparatus further comprises a ring-type magnetic transducer head in spaced adjacency to the perpendicular recording layer.

11. An apparatus, comprising:
    a magnetically soft underlayer (SUL);
    an interlayer stack overlying the SUL,
       wherein the interlayer stack comprises a seed layer of an fcc material;
    a perpendicular magnetic recording layer overlying the interlayer stack; and a means for increasing a perpendicular component of a magnetic field corresponding to a magnetic transducer head at an angle approaching 45°.

12. The apparatus of claim 11, wherein the SUL has a thickness from about 1 nm to about 40 nm.

13. The apparatus of claim 11, wherein the SUL comprises a saturation magnetization (Ms) from about 500 emu/cc to about 2,000 emu/cc.

14. The apparatus of claim 12, wherein the SUL comprises a saturation magnetization-thickness (Mst) product less than about 4 memu/cm$^2$.

15. The apparatus of claim 14, wherein the interlayer stack has a thickness from about 5 nm to about 200 nm.

16. The apparatus of claim 14, wherein the interlayer stack has a thickness from about 5 nm to about 30 nm.

17. The apparatus of claim 15, wherein the interlayer stack further comprises a spacer layer underlying the seed layer, and wherein the spacer layer has a thickness from about 20 nm to about 100 nm.

18. The apparatus of claim 17, wherein the spacer layer is of CrTa, TaW, TiCr, or TiW.

19. The apparatus of claim 17, wherein the interlayer stack further comprises an interlayer overlying the seed layer, and wherein the interlayer is of an hcp material.

20. The apparatus of claim 18, further comprising a magnetic transducer head, wherein the magnetic transducer head comprises a ring-type magnetic transducer head in spaced adjacency to the perpendicular recording layer, and wherein the means for orienting a total magnetic field corresponding to a magnetic transducer head at an angle of about 45° comprises a thickness of the SUL in combination with a distance of the SUL from the perpendicular recording layer sufficient to orient the total magnetic field corresponding to the ring-type magnetic transducer head at an angle of about 45°.

* * * * *